US008737382B2

(12) United States Patent
Moon et al.

(10) Patent No.: US 8,737,382 B2
(45) Date of Patent: May 27, 2014

(54) NETWORK OPERATOR BROKERING SYSTEM AND TELEPHONE SYSTEM FOR PROVIDING OPTIMAL ROUTING PATH FOR VOICE CALL USING THE SAME AND PROVIDING METHOD THEREOF

(75) Inventors: Jang Won Moon, Seoul (KR); Jung Hun Moon, Seoul (KR)

(73) Assignee: NHN Corporation, Seongnam-si (KR)

(*) Notice: Subject to any disclaimer, the term of this patent is extended or adjusted under 35 U.S.C. 154(b) by 1937 days.

(21) Appl. No.: 11/506,620

(22) Filed: Aug. 17, 2006

(65) Prior Publication Data

US 2007/0064607 A1    Mar. 22, 2007

Related U.S. Application Data

(63) Continuation of application No. PCT/KR2005/000448, filed on Feb. 17, 2005.

(30) Foreign Application Priority Data

Feb. 18, 2004  (KR) .................. 10-2004-0010634

(51) Int. Cl.
*H04L 12/66* (2006.01)
*H04M 15/00* (2006.01)

(52) U.S. Cl.
USPC ...................... 370/352; 379/114.02

(58) Field of Classification Search
USPC ............ 370/356, 352; 705/1, 37; 379/114.02, 379/221.01, 221.02
See application file for complete search history.

(56) References Cited

U.S. PATENT DOCUMENTS 5,473,630 A * 12/1995 Penzias et al. ............ 379/114.02
5,799,072 A *  8/1998 Vulcan et al. ............. 379/114.02

(Continued)

FOREIGN PATENT DOCUMENTS

JP    2000-115372    4/2000
JP    2000-261571    9/2000

(Continued)

OTHER PUBLICATIONS

International Search Report and Written Opinion of ISA dated Jun. 22, 2005 for PCT/KR2005/000448 filed on Feb. 17, 2005.

*Primary Examiner* — Sonia Gay
(74) *Attorney, Agent, or Firm* — Greer Burns & Crain Ltd.

(57) ABSTRACT

A system and method for selecting a path for a voice call over an access network from a plurality of access networks. The system includes a call negotiation agent configured to store price information associated with the voice call in which the price information is provided through at least one of the plurality of access networks. According to the present invention, a call negotiation server is configured to store the price information associated with a voice call and store the estimation information indicative of the quality of the access networks after the voice call through the plurality of access networks is completed. The system also performs a call negotiation with at least one network operator in real time using the price information and the estimation information and selects an access network for providing a path among the plurality of access networks.

18 Claims, 4 Drawing Sheets

(56) References Cited

U.S. PATENT DOCUMENTS

| | | | |
|---|---|---|---|
| 5,802,502 A * | 9/1998 | Gell et al. ..................... 705/37 |
| 5,878,122 A * | 3/1999 | White et al. ............. 379/115.01 |
| 6,205,135 B1 * | 3/2001 | Chinni et al. ................. 370/356 |
| 6,442,547 B1 | 8/2002 | Bowman-Amuah |
| 6,671,359 B1 * | 12/2003 | Enzmann et al. ........ 379/115.01 |
| 6,678,265 B1 | 1/2004 | Kung et al. |
| 7,058,387 B2 * | 6/2006 | Kumar et al. ................. 455/406 |
| 2002/0044635 A1 * | 4/2002 | Klug ........................ 379/114.02 |
| 2003/0014271 A1 * | 1/2003 | Hwang ............................ 705/1 |
| 2004/0199667 A1 | 10/2004 | Dobbins |

FOREIGN PATENT DOCUMENTS

| | | |
|---|---|---|
| JP | 2001-339591 | 12/2001 |
| JP | 2001-352360 | 12/2001 |
| JP | 2003-018326 | 1/2003 |
| JP | 2003-092622 | 3/2003 |
| KR | 10-1999-0068258 | 9/1999 |
| KR | 10-2000-0023925 | 5/2000 |
| KR | 10-2001-0025163 | 4/2001 |
| KR | 10-2003-0072517 | 9/2003 |

* cited by examiner

NETWORK OPERATOR BROKERING SYSTEM AND TELEPHONE SYSTEM FOR PROVIDING OPTIMAL ROUTING PATH FOR VOICE CALL USING THE SAME AND PROVIDING METHOD THEREOF

CROSS-REFERENCE TO RELATED APPLICATIONS

This application is a continuation of International Application No. PCT/KR2005/000448, filed Feb. 17, 2005, which claims the benefit of Korean Patent Application No. 10-2004-0010634 filed Feb. 18, 2004.

BACKGROUND OF THE INVENTION (a) Field of the Invention

This invention relates to an apparatus for providing an optimal path for a voice call, and more particularly to a network operator negotiation apparatus for providing an optimal path for a voice call through a negotiation with a network operator, and a telephone system and method using the same.

(b) Description of the Related Art

With the current change of monopoly regulations within the telecommunication industry, special telecommunication service providers have appeared providing inexpensive call charges to users using new technologies such as VoIP (Voice over Internet Protocol) implemented for both long-distance and short-distance calls. Such special telecommunication service providers allow a user to select one telecommunication service provider using identification numbers assigned to the telecommunication service providers and to make a telephone call using a telecommunication line assigned to the selected telecommunication service provider.

However, among such special telecommunication service providers, a leading enterprise dominates the market for special telecommunication services. Such a predominant position of the leading enterprise is due to the enterprise using its funds for good advertisement rather than good quality of service or inexpensive call charges. Consequently, there arises a problem in that consumers may only use an expensive telecommunication line of the leading enterprise without recognizing a variety of competitive goods provided by lesser known special telecommunication service providers.

On the other hand, each special telecommunication service provider attempts to offer a competitive price to consumers by presenting an extraordinarily inexpensive price for specific countries to consumers or by securing a private line between one specific area and another. However, such a competitive price is only available when consumers become aware of it. As a result, the special telecommunication service providers have a structure that results in an increased load on the consumers due to advertisement costs rather than telecommunication line costs.

Moreover, although some network operators attempt to provide additional services using a private line connecting between a plurality of areas, for the most part, idle resources are unused due to the marketing costs that would need to be expended to utilize such idle resources. As conventional techniques for overcoming the above problems, there exist Korean Patent Application Publication No. 1999-68258, which is owned by Jong-Kil, Kang, titled "Telecommunication terminal containing telephone charge Information", Korean Patent Application Publication No. 1999-46400, which is owned by Sewon Telecom Incorporated, titled "Auto telephone number selection apparatus and telephone docking system including the same", Korean Patent Application Publication No. 2001-25163, which is owned by Ntel Technologies, Incorporated, titled "Service of connection to telecommunication service provider providing most inexpensive telephone charge based on charge system", Korean Patent Application Publication No. 2003-72517, which is owned by Chul-Sung, Lee, titled "Lowest charge telephone connecting method", and the like.

In the above-mentioned conventional technologies, a telephone terminal receives information on telephone charges from telecommunication service providers and stores the received telephone charge information in a memory or database contained within the terminal. Then, when a user of the terminal makes a call, the telephone number is compared with the telephone charge information for making a voice call through a telecommunication service provider stored in the memory or database to offer a lowest telephone charge service to the user. However, with these technologies, there is a problem in that it is difficult to meet real-time price fluctuation of the telecommunication service providers, and also, of selecting a telecommunication service provider depending on quality of service in addition to the telephone charges of the telecommunication service providers.

SUMMARY OF THE INVENTION

It is an object of the present invention to provide a network operator negotiation apparatus for coupling a subscriber to a counterpart for a voice call through a call routing path selected through an automatic negotiation with systems of network operators in compliance with certain conditions set by the subscriber, although the subscriber does not select a certain call routing path directly, and a telephone system and method for providing an optimal path for a voice call using the same.

To achieve the above object, according to an aspect of the present invention, there is provided a telephone system for providing an optimal path for a voice call, comprising: an exchanger for interoperating access networks provided by a plurality of network operators; a network operator negotiation apparatus for selecting an access network for providing an optimal path for a voice call among the plurality of access networks; and a call relay for providing information on conditions desired by a subscriber to the network operator negotiation apparatus when a call request for a voice call is originated from the subscriber, and, when the access network for providing the optimal path for the voice call is selected based on information on conditions desired by the subscriber, and information on the selected network is received by the call relay, transmitting the received information on the access network to the exchanger, wherein the exchanger couples the subscriber to a counterpart of the voice call through an access network corresponding to the information on the access network transmitted from the call relay such that the optimal path for the voice call based on the conditions desired by the subscriber is provided to the subscriber.

According to another aspect of the present invention, there is provided a method for providing an optimal path for a voice call, the method comprising: a) receiving a request for a voice call from a subscriber; b) performing a call negotiation with a plurality of network operators for a plurality of access networks provided by the plurality of network operators and selecting in real time an access network for providing an optimal path among the plurality of access networks based on conditions preset by the subscriber; and c) coupling the subscriber to a counterpart of the voice call through the selected access network to perform the voice call therebetween.

DETAILED DESCRIPTION OF THE PREFERRED EMBODIMENTS

Hereinafter, a network operator negotiation apparatus for providing an optimal path for a voice call, and a telephone system including the same, will be described in accordance with exemplary embodiments.

In the following embodiments of the present invention, services are separated from networks, various forms of networks are automatically selected by a telecommunication marketing specialist in a condition-compliant manner so that a maximal convenience is offered to consumers, and a plurality of network operators provide services in fair conditions.

Figure 1:
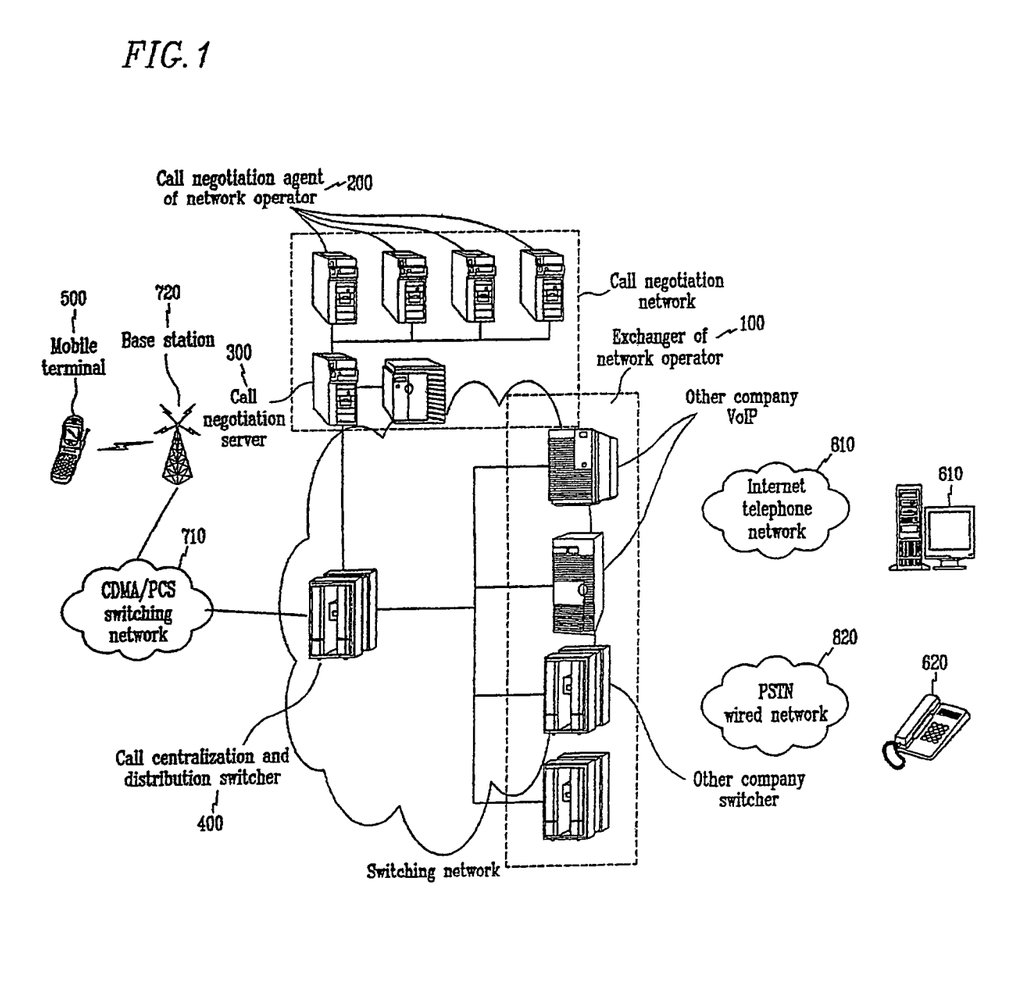
FIG. 1 is a block diagram of a telephone system for providing an optimal path for a voice call in accordance with a first embodiment of the present invention.

FIG. 1 is a block diagram of a telephone system for providing an optimal path for a voice call in accordance with a first embodiment of the present invention.

As shown in FIG. 1, a telephone system for providing an optimal path for a voice call in accordance with a first embodiment of the present invention includes an exchanger 100, a network operator call negotiation agent 200, a call negotiation server 300, and a call centralization and distribution switcher 400.

The exchanger 100 intercouples access networks provided by a plurality of network operators.

The network operator call negotiation agent 200 stores real-time price information on a voice call service provided by each network operator.

The call negotiation server 300 stores estimation information after the call is processed, such as price, quality, and the like, and negotiates with the network operator call negotiation agent 200 in real time for a call request according to a certain disposition of a telephone subscriber to select one of the plurality of network operators, based on the stored estimation information and price information provided by the network operator call negotiation agent 200. Although it is exemplified in this embodiment that the estimation information is stored in the call negotiation server 300, the estimation information may be stored in a separate estimation server for smooth management of the estimation information and transferred from the estimation server to the call negotiation server 300 when requested by the is call negotiation server 300.

The call centralization and distribution switcher 400 pre-stores information on a disposition of a telephone subscriber, for example, disposition to desire the lowest price at a low quality of voice call, disposition to desire the lowest price at a certain level of quality of voice call, disposition to desire the highest quality of voice call irrespective of price, etc., and transfers a call to the exchanger 100 that connects a specified call request from a mobile terminal 500 to counter terminals 610, 620 over an access network provided by a network operator selected by the call negotiation server 300. Here, although it is exemplified that the call centralization and distribution switcher 400 stores the information on the disposition of the subscriber, the scope of the present invention is not limited to this. For example, the subscriber disposition information may be stored in the call negotiation server 300 to conduct a negotiation for a disposition desired by the subscriber in a call negotiation. Moreover, the subscriber disposition information may be stored in a separate registration server for smooth management of the subscriber disposition information and may be transferred to the call negotiation server 300 when requested by the call negotiation server 300 for use in the call negotiation for selecting an optimal path. In addition, the mobile terminal 500 uses an identification number for a specific negotiation service to select the optimal path through the call negotiation in accordance with the first embodiment. The use of such an identification number for the specific negotiation service allows a call requested by the mobile terminal 500 to be transferred to the call centralization and distribution switcher 400.

The call centralization and distribution switcher 400 enables a mobile access to the mobile terminal 500 via a base station 720 accessed over a CDMA/PCS switching network 710. Since it is obvious to those skilled in the art how the call centralization and distribution switcher 400 enables the mobile access to the mobile terminal 500 via the base station 720 accessed over the CDMA/PCS switching network 710, detailed explanation thereof will be omitted for the purpose of brevity of description.

The call centralization and distribution switcher 400, the call negotiation server 300, and the network operator call negotiation agent 200 may be separately used as a network operator negotiation network for conducting a negotiation for providing an optimal path for a specific requested voice call, separately from a network operator for providing the access network through the exchanger 100.

The exchanger 100 includes a gateway coupled to an Internet telephone network 810, a switcher coupled to a PSTN wired network 820, a gateway coupled to a plurality of different company VoIPs, and a switcher coupled to a plurality of different company networks.

Figure 2:
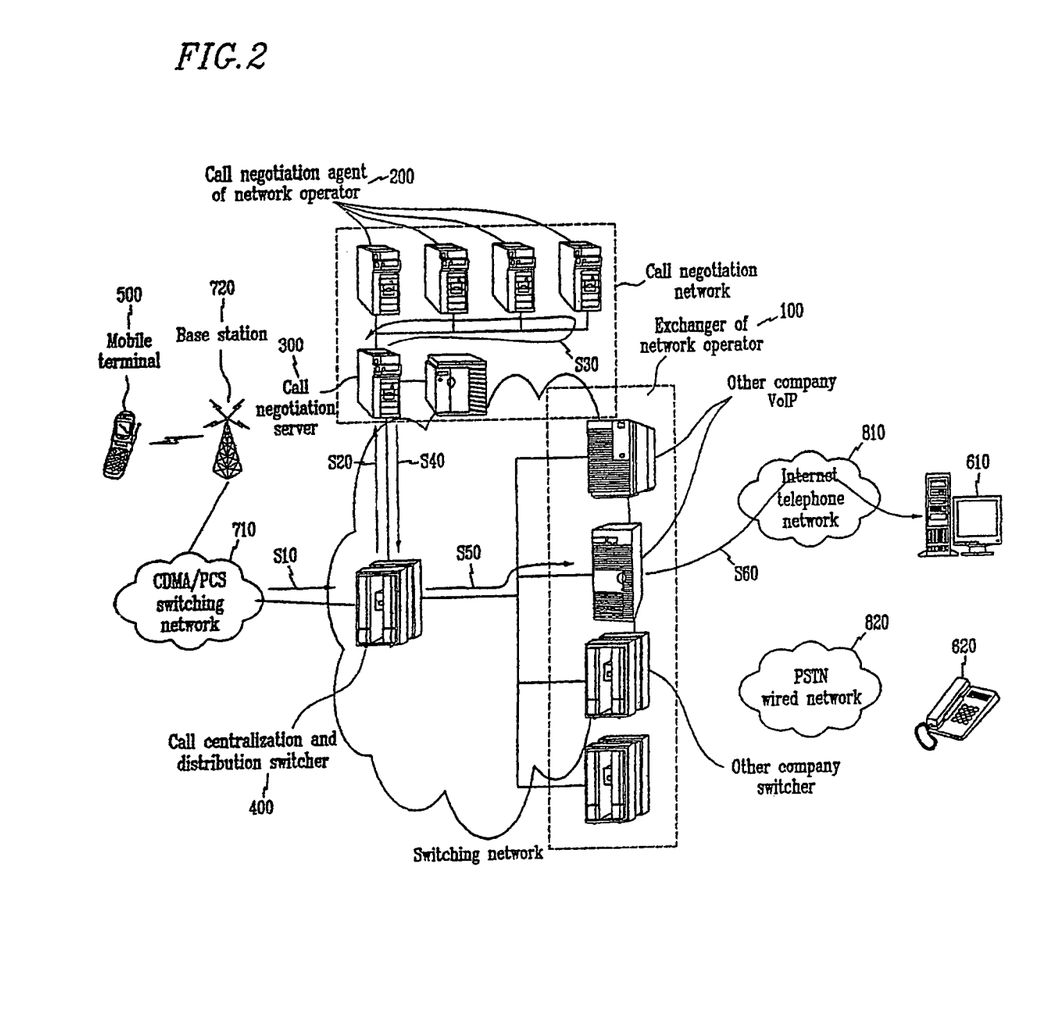
FIG. 2 is a diagram illustrating an operation flow of the telephone system of FIG. 2.

Hereinafter, a method for providing the optimal path for the voice call in accordance with the first embodiment of the present invention will be described with reference to FIG. 2.

First, a subscriber, subscribed to a service for providing an optimal path for a voice call in accordance with the first embodiment, pre-registers disposition information on an optimal path to be serviced for him in the call centralization and distribution switcher 400. In this case, if information on the subscriber is pre-stored in the call negotiation server 300 or the separate registration server (not shown), the disposition information may also be stored in a corresponding location of the servers.

Thereafter, when the subscriber makes a call by means of the mobile terminal 500, using an identification number with which the service of providing the optimal path for the voice call in accordance with the first embodiment of the present invention can be used, an originating call is transmitted to the call centralization and distribution switcher 400 over the base station 720 and the CDMA/PCS switching network 710 (Step S10).

Next, upon receiving the originating call, the call centralization and distribution switcher 400 sends an inquiry to the call negotiation server 300 in order to select a network operator for providing an optimal call routing path for the received originating call (Step S20). At this time, the pre-registered subscriber disposition information is also sent to the call negotiation server 300.

Based on the inquiry transmitted by the call centralization and distribution switcher 400, the call negotiation server 300 progresses a negotiation with diverse network operator call negotiation agents 200, which exist on a call negotiation network, for the voice call, and selects a network operator for providing an optimal access network in compliance with the disposition information selected by the subscriber (Step S30). At this time, the call negotiation server 300 selects an optimal network operator based on price information of the voice call provided from the diverse network operator call negotiation agents 200 of network operators, quality information contained in the estimation information stored in the call negotiation server 300, and the like.

Next, the call negotiation server 300 transmits access network information provided by the network operator selected in Step S30 to the call centralization and distribution switcher 400 (Step S40).

Based on the access network information transmitted from the call negotiation server 300, the call centralization and distribution switcher 400 transmits the originating call from the subscriber to a corresponding gateway or switcher in the exchanger 100 (Step S50).

A corresponding access network provider in the exchanger 100 couples the originating call, which is transmitted from the call centralization and distribution switcher 400, to destination communication devices 610 and 620 for allowing the subscriber 500 to make a voice call with the destination communication devices 610 and 620 (Step S60).

In this way, when the voice call between the subscriber 500 and the destination communication devices 610 and 620 is terminated after the voice call is established through the optimal path in compliance with the specific disposition of the subscriber, quality of service provided by the corresponding access network provider is collected through a variety of channels, for example, a questionnaire, a voice quality estimation, or the like, and is stored In the call negotiation server 300 or the separate estimation server (not shown).

In the above description, the voice call of the mobile terminal 500 with VoIP subscribers, wired PSTN subscribers, mobile communication subscribers, or the like has been exemplified. Hereinafter, a network operator negotiation apparatus for providing an optimal path for a voice call, and a telephone system using the same, in accordance with a second embodiment of the present invention will be described with reference to FIG. 3.

Figure 3:
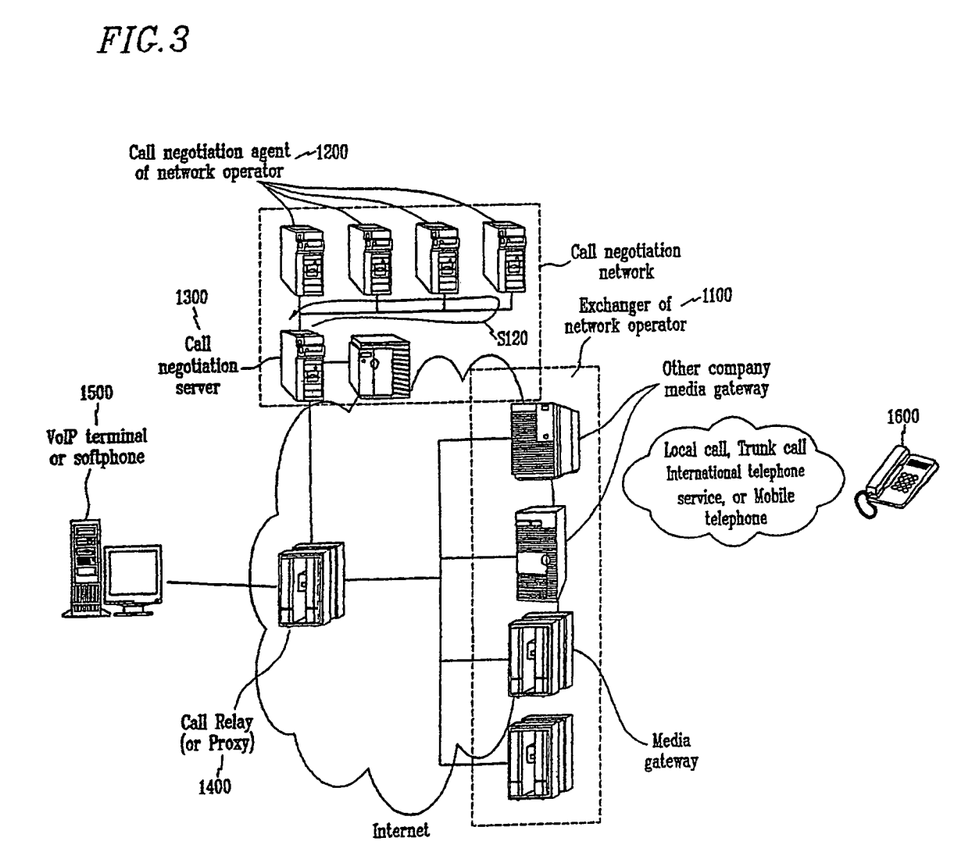
FIG. 3 is a block diagram of a telephone system for providing an optimal path for a voice call in accordance with a second embodiment of the present invention.

FIG. 3 is a block diagram of a telephone system for providing an optimal path for a voice call in accordance with a second embodiment of the present invention.

As shown in FIG. 3, a telephone system for providing an optimal path for a voice call in accordance with the second embodiment of the present invention includes an exchanger 1100, a network operator call negotiation agent 1200, a call negotiation server 1300, and a call relay 1400.

Here, the network operator call negotiation agent 1200 and the call negotiation server 1300 are similar in their structures and functions to the network operator call negotiation agent 200 and the call negotiation server 300, respectively, described with reference to FIG. 1. Therefore, since the structures and functions of the network operator call negotiation agent 1200 and the call negotiation server 1300 will be easily understood by those skilled in the art with reference to FIG. 1, detailed explanation thereof will be omitted for the purpose of brevity of description.

Moreover, the exchanger 1100 is similar in its structure and function to the exchanger 100 described with reference to FIG. 1, except that the exchanger 1100 includes a media gateway for receiving a voice call request from a VoIP terminal or softphone 1500 and transmitting the received voice call request to various kinds of media networks or wired/wireless networks. Therefore, since the structure and function of the exchanger 1100 will be easily understood by those skilled in the art with reference to FIG. 1, detailed explanation thereof will also be omitted.

In addition, the call relay 1400 is similar in its structure and function to the call centralization and distribution switcher 400 described with reference to FIG. 1, except that the call relay 1400 receives an originating call from the VoIP terminal or softphone 1500 using an identification number with which a service in accordance with the second embodiment of the present invention can be used. Therefore, since the structure and function of the call relay 1400 will be easily understood by those skilled in the art with reference to FIG. 1, detailed explanation thereof will be omitted. In the VoIP terminal, a call transfer request may be performed using SIP (Session Initiation Protocol) or the like. Since SIP is obvious to those skilled in the art, detailed explanation thereof will be omitted.

Figure 4:
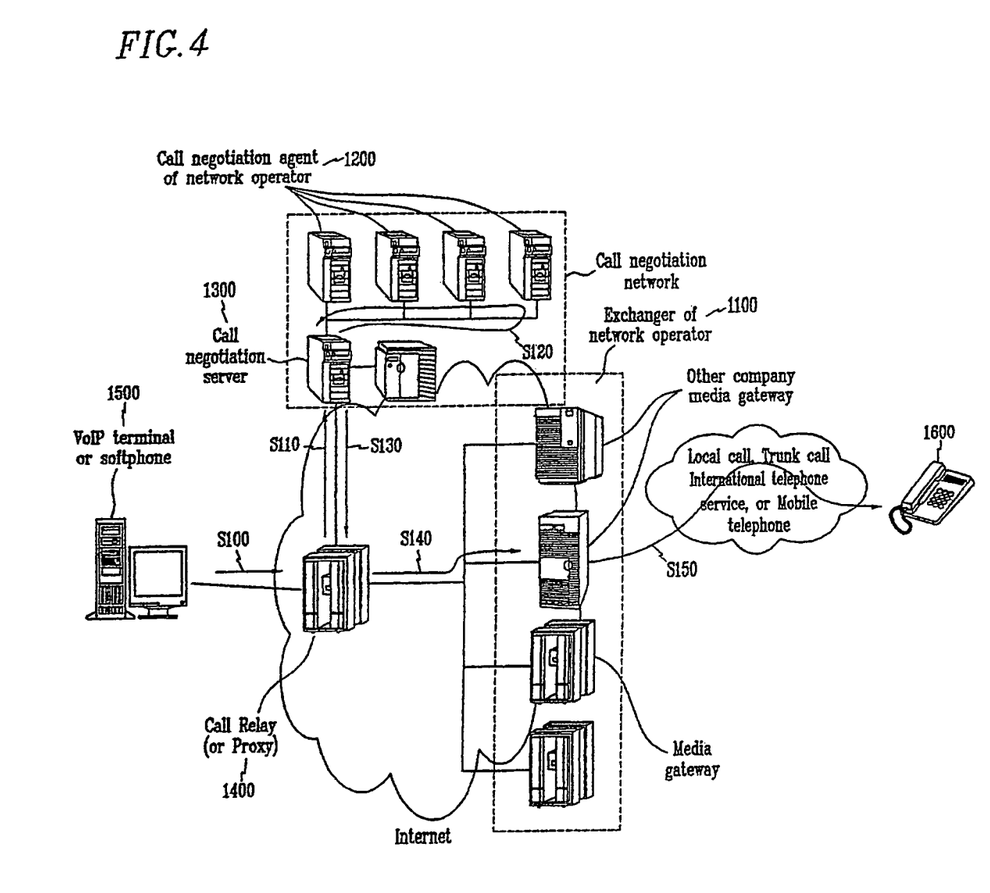
FIG. 4 is a diagram illustrating an operation flow of the telephone system of FIG. 3.

Hereinafter, a method for providing an optimal path for a voice call in accordance with the second embodiment of the present invention will be described with reference to FIG. 4.

First, a subscriber, subscribed to a service for providing an optimal path for a voice call in accordance with the second embodiment, pre-registers disposition information on an optimal path to be serviced for him in the call relay 1400. In this case, if information on the subscriber is pre-stored in the call negotiation server 1300 or the separate registration server (not shown), the disposition information may also be stored in a corresponding location of the servers.

Thereafter, when the subscriber makes a call by means of the VoIP terminal or the softphone 1500, using an identification number with which the service of providing the optimal path for the voice call in accordance with the second embodiment of the present invention can be used, an originating call is transmitted to the call relay 1400 (Step S100).

Next, upon receiving the originating call, the call relay 1400 sends an inquiry to the call negotiation server 1300 in order to select a network operator for providing an optimal call routing path for the received originating call (Step S110). At this time, the pre-registered subscriber disposition information is also sent to the call negotiation server 1300.

Based on the inquiry transmitted to the call relay 1400, the call negotiation server 1300 progresses a negotiation with diverse network operator call negotiation agents 1200, which exist on a call negotiation network, for the voice call, and selects a network operator for providing an optimal access network in compliance with the disposition information selected by the subscriber (Step S120). At this time, the call negotiation server 1300 selects an optimal network operator based on price Information of the voice call provided from the diverse network operator call negotiation agents 1200 of network operators, quality information contained in the estimation information stored in the call negotiation server 1300, and the like.

Next, the call negotiation server 1300 transmits access network information provided by the network operator selected in Step S120 to the call relay 1400 (Step S130).

Based on the access network information transmitted from the call negotiation server 1300, the call relay 1400 transmits the originating call from the subscriber to a corresponding gateway in the exchanger 1100 (Step S140).

A corresponding access network provider in the exchanger 1100 couples the originating call, which is transmitted from the call relay 1400, to a destination communication device 1600 for allowing the subscriber 1500 to make a voice call with the destination communication device 1600 (Step S150).

In this way, when the voice call between the subscriber 1500 and the destination communication device 1600 is terminated after the voice call is established through the optimal path in compliance with the specific disposition of the subscriber, quality of service provided by the corresponding access network provider is collected through a variety of channels, for example, an internet telephone client or the like, and is stored in the call negotiation server 1300 or the separate estimation server (not shown).

Although the exemplary embodiments of the present invention have been described in detail, the present invention is not limited to this, and may be changed or modified in various ways, For example, although the call originated from the subscriber using a mobile terminal, a VoIP terminal, or a softphone as described in the exemplary embodiments, the negotiation system for providing the optimal path in accordance with the exemplary embodiments of the present invention can be applied to a case where the subscriber originates the call using a terminal coupled to a general PSTN wired network. In the case of the general PSTN wired network, the negotiation system can be implemented using an intelligent network instead of the call centralization and distribution switcher 400 and the call relay 1400 for making an inquiry with the call negotiation servers 300 and 1300. In such an intelligent network, after the negotiation is completed, the voice call is transmitted to a local node of the network operator for providing the voice call service. Techniques for providing access to the general PSTN wired network through the intelligent network are obvious to those skilled in the art. Therefore, without detailed explanation of these techniques, it is easily understood by those skilled in the art that the optimal path for the voice call can be provided through the general PSTN wired network.

The present invention presents advantages to subscribers, negotiation service providers, and network operators as follows.

1) Advantage to subscriber.

Since subscribers automatically select the optimal path among a variety of paths to destination communication devices with which the subscribers wish to make a voice call, or among network operators, call charges can be significantly reduced.

2) Advantage to negotiation service providers (virtual network operators).

Network service providers can provide distinct services to the subscribers in compliance with individual dispositions of subscribers without investing in a special network and assorted network operators through a periodical estimation feedback. In addition, since there is no need to be dependent on a certain network, troubles such as traffic congestion can be naturally overcome from a more neutral point of view. Moreover, as the network operators enter into an autonomous competition on price, environments where rent for a network can be lowered to a required amount can be achieved. In addition, as the negotiation is progressed based on real-time price information of the network operators, an optimal path for the voice call can be provided to the subscribers in real time.

3) Advantage to network operators.

A market, in which the network operators, even if they are not a nationwide network provider but only a local network provider, can resell their networks with services only for their networks, can be opened. Moreover, concentration of marketing funds on upgrading the quality of service provided by them may result in a fall in cost for the service and an improvement in quality of service. In addition, price competition in an open market can be promoted by providing networks through a fair competition for service. Further, a policy for fluctuation of price for services can be established in real time by providing an optimal path in real time.

What is claimed is:

1. A system for selecting a path for a voice call over an access network from a plurality of access networks, the system comprising:
    a call negotiation server configured to:
        store estimation information indicative of the quality of the plurality of access networks, wherein the estimation information comprises information about a voice quality estimation provided from users of the access networks,
        in response to a request for the voice call, automatically perform a call negotiation with call negotiation agents of the plurality of access networks with respect to the request for the voice call in real time and receive real time price information from the call negotiation agents, the real time price information comprising a plurality of prices, each price provided from at least one of the plurality of access networks with respect to the request for the voice call, and
        select an access network for providing a path for the voice call among the plurality of access networks based on the real time price information and the estimation information.

2. The system of claim 1, wherein the call negotiation server is configured to select the access network based, at least in part, on at least one condition that is either pre-stored in the call negotiation server or obtained from a subscriber.

3. The system of claim 2, wherein the at least one condition comprises a condition indicative of the lowest price at a commensurate quality of voice call, a condition indicative of the lowest price at a predetermined level of quality of voice call, and a condition indicative of the highest quality of voice call irrespective of price.

4. A telephone system for providing a path for a voice call, the system comprising:
    an exchanger configured to operate with a plurality of access networks;
    a network negotiation apparatus configured to select an access network to provide the path for the voice call from the plurality of access networks; and a
    call relay configured to provide to the network negotiation apparatus information indicative of at least one condition when a call request for the voice call is originated, wherein the network negotiation apparatus is configured to transmit said information over the selected access network to the exchanger, when the access network for providing the path for the voice call is selected, and wherein the exchanger provides a subscriber with access to a counterpart of the voice call through the access network selected based, at least in part, on the information provided by the call relay,
    wherein the network negotiation apparatus comprises:
    a call negotiation server configured to
        store estimation information indicative of the quality of the plurality of access networks,
        in response to the call request, perform a call negotiation with call negotiation agents in real time and receive real time price information from the call negotiation agents, and
        select the access network for providing the path for the voice call among the plurality of access networks based on the real time price information and the estimation information.

5. The telephone system of claim 4, wherein the at least one condition comprises at least one condition that is either pre-stored in the call negotiation server or obtained from a subscriber.

6. The telephone system of claim 5, wherein the at least one condition comprises a condition indicative of the lowest price at a commensurate quality of voice call, a condition indicative of the lowest price at a certain level of quality of voice call, and a condition indicative of the highest quality of voice call irrespective of price.

7. The telephone system of claim 5, wherein the subscriber accesses the call relay using an identification number for a specific call negotiation service.

8. The telephone system of claim 5, wherein the subscriber accesses the call relay using a mobile terminal.

9. The telephone system of claim 5, wherein the subscriber accesses the call relay using a VoIP (Voice over Internet Protocol) terminal or a softphone.

10. The telephone system of claim 6, wherein the subscriber accesses the call relay using a wired telephone.

11. The telephone system of claim 4, wherein the access networks comprise at least one of an Internet network, a PSTN wired network, and a mobile communication network.

12. The telephone system of claim 4, wherein the exchanger comprises at least one of a PSTN switch, an Internet telephone gateway, and a media gateway.

13. A method of providing a path for a voice call, the method comprising:
   receiving a call request for a voice call from a subscriber;
   performing a call negotiation in real time for at least one of a plurality of access networks, comprising:
      in response to the call request, communicating with call negotiation agents of the plurality of access networks with respect to the call request;
      receiving real time price information for the voice call request from the call negotiation agents;
      selecting in real time an access network for providing the path for the voice call among the plurality of access networks based on the real time price information and estimation information indicative of the quality of the plurality of access networks, the estimation information comprising information about a voice quality estimation provided by users of the access networks; and
   providing the subscriber with access to a counterpart of the voice call through the selected access network to perform the voice call therebetween.

14. The method of claim 13, further comprising:
   storing price information associated with the voice call and estimation information indicative of the quality about the selected access network after the voice call is completed.

15. The method of claim 13, wherein performing the call negotiation comprises selecting the access network based further on at least one condition the condition comprising at least one of a condition indicative of the lowest price at a commensurate quality of voice call, a condition indicative of the lowest price at a predetermined level of quality of voice call, and a condition indicative of the highest quality of voice call irrespective of price.

16. The method of claim 13, wherein performing the call negotiation comprises negotiating with a plurality of network operators.

17. The system of claim 1, wherein the call negotiation agents are configured to store new and different real time price information during the call negotiation.

18. The telephone system of claim 4, wherein the call negotiation agents are configured to store updated real time price information during the call negotiation.

* * * * *